(12) United States Patent
Akazawa et al.

(10) Patent No.: US 10,878,325 B2
(45) Date of Patent: Dec. 29, 2020

(54) METHOD AND DEVICE FOR ACQUIRING STATE DATA INDICATING STATE OF USER

(71) Applicant: SAMSUNG ELECTRONICS CO., LTD., Suwon-si (KR)

(72) Inventors: Yoshiaki Akazawa, Minoh (JP); Jae-hwan Sim, Suwon-si (KR); Kousuke Hirasawa, Minoh (JP); Min-woo Gil, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 691 days.

(21) Appl. No.: 15/532,793

(22) PCT Filed: Dec. 2, 2015

(86) PCT No.: PCT/KR2015/013043
§ 371 (c)(1),
(2) Date: Jun. 2, 2017

(87) PCT Pub. No.: WO2016/089105
PCT Pub. Date: Jun. 9, 2016

(65) Prior Publication Data
US 2017/0344891 A1 Nov. 30, 2017

(30) Foreign Application Priority Data
Oct. 29, 2015 (JP) ................... 2015-213452

(51) Int. Cl.
*G06K 9/62* (2006.01)
*G06K 9/00* (2006.01)
(Continued)

(52) U.S. Cl.
CPC ......... *G06N 5/048* (2013.01); *G06K 9/00362* (2013.01); *G06K 9/629* (2013.01);
(Continued)

(58) Field of Classification Search
CPC .... G06N 5/048; G06N 20/00; G06K 9/00362; G06K 9/629; G06K 9/00302; G06K 9/00342; G10L 25/63
See application file for complete search history.

(56) References Cited

U.S. PATENT DOCUMENTS 8,229,877 B2 * 7/2012 Sugihara ................. G06N 5/02
706/54
8,898,687 B2 11/2014 Hulten et al.
(Continued)

FOREIGN PATENT DOCUMENTS

CN 103207675 A 7/2013
CN 103237248 A 8/2013
(Continued)

OTHER PUBLICATIONS

International Search Report dated Mar. 11, 2016, issued by the International Searching Authority in counterpart International Application No. PCT/KR2015/013043 (PCT/ISA/210).
(Continued)

*Primary Examiner* — Vincent Gonzales
*Assistant Examiner* — Casey R. Garner
(74) *Attorney, Agent, or Firm* — Sughrue Mion, PLLC

(57) ABSTRACT

Provided is a method of obtaining state data indicating a state of a user. The method includes: obtaining estimation models for obtaining pieces of state data existing in a plurality of layers from sensor data obtained by a sensor; obtaining at least one piece of sensor data; obtaining state data of a lower layer from the at least one piece of sensor data, based on the estimation models; and obtaining state data of a higher layer from the state data of the lower layer, based on the estimation models.

14 Claims, 14 Drawing Sheets

(51) Int. Cl.
*G06N 20/00* (2019.01)
*G10L 25/63* (2013.01)
*G06N 5/04* (2006.01)

(52) U.S. Cl.
CPC ..... *G06K 9/00302* (2013.01); *G06K 9/00342* (2013.01); *G06N 20/00* (2019.01); *G10L 25/63* (2013.01)

(56) References Cited

U.S. PATENT DOCUMENTS

| | | | |
|---|---|---|---|
| 9,280,716 B2* | 3/2016 | Yamaguchi | G06F 3/011 |
| 9,545,567 B2 | 1/2017 | Han et al. | |
| 9,769,413 B2 | 9/2017 | Kim et al. | |
| 2013/0015946 A1* | 1/2013 | Lau | G07C 9/00 340/5.2 |
| 2013/0268954 A1* | 10/2013 | Hulten | H04N 21/442 725/12 |
| 2013/0268955 A1 | 10/2013 | Conrad et al. | |
| 2013/0298146 A1* | 11/2013 | Conrad | H04N 21/2668 725/12 |
| 2013/0298158 A1 | 11/2013 | Conrad et al. | |
| 2014/0067746 A1 | 3/2014 | Hong et al. | |
| 2014/0112556 A1 | 4/2014 | Kalinli-Akbacak | |
| 2014/0223467 A1 | 8/2014 | Hayton et al. | |
| 2014/0234815 A1 | 8/2014 | Jang et al. | |
| 2016/0007899 A1* | 1/2016 | Durkee | A61B 5/0476 600/544 |
| 2017/0097985 A1* | 4/2017 | Miyahara | G06Q 30/02 |
| 2018/0150751 A1 | 5/2018 | Lee | |

FOREIGN PATENT DOCUMENTS

| | | |
|---|---|---|
| CN | 103383764 A | 11/2013 |
| CN | 103809746 A | 5/2014 |
| CN | 103826146 A | 5/2014 |
| JP | 2001-83984 A | 3/2001 |
| JP | 2005-199403 A | 7/2005 |
| JP | 2005-346471 A | 12/2005 |
| JP | 2007109110 A | 4/2007 |
| JP | 2009245321 A | 10/2009 |
| JP | 201337471 A | 2/2013 |
| JP | 2013153349 A | 8/2013 |
| JP | 201453002 A | 3/2014 |
| JP | 2014164383 A | 9/2014 |
| WO | 2012011665 A2 | 1/2012 |
| WO | 2014159793 A1 | 10/2014 |

OTHER PUBLICATIONS

Written Opinion dated Mar. 11, 2016, issued by the International Searching Authority in counterpart International Application No. PCT/KR2015/013043 (PCT/ISA/237).
Communication dated Oct. 1, 2019 issued by the Japan Patent Office in counterpart Japanese Patent Application No. 2015-213452.
Communication dated Oct. 8, 2019, issued by the State Intellectual Property Office of P.R. China in counterpart Chinese Application No. 201580065848.5.
Communication dated Jun. 17,2020 issued by the State Intellectual Property Office of P.R. China in Chinese Patent Application No. 201580065848.5.
Communication dated Mar. 27, 2020 issued by the State Intellectual Property Office of P.R. China in counterpart Chinese Application No. 201580065848.5.

* cited by examiner

METHOD AND DEVICE FOR ACQUIRING STATE DATA INDICATING STATE OF USER

This application is a National stage entry of International Application No. PCT/KR2015/013043, filed on Dec. 2, 2015, which claims priority from Japanese Application No. 2014-244404 filed Dec. 2, 2014, Japanese Application No. 2014-244405 filed on Dec. 2, 2014, and Japanese Application No. 2015-213452 filed Oct. 29, 2015, in the Japanese Patent Office. The disclosures of each of the applications are herein incorporated by reference in their entirety.

TECHNICAL FIELD

The present invention relates to a method and a device for obtaining state data indicating a state of a user, based on sensor data obtained by a sensor.

BACKGROUND ART

Devices are capable of analyzing a state of a user by using sounds, images, and biometric signals of the user, which are detected by a sensor. The devices may provide various services to the user in consideration of the state of the user. For example, the devices may recommend new content to the user, based on a concentration degree, an interest degree, or the like of the user with respect to output content.

However, a noise may be included in sensor data or partial sensor data cannot be obtained depending on an operation state or surrounding environment of the sensor. Therefore, there is a need for a method of obtaining state data of a user even when a noise is included in sensor data or a device cannot obtain the sensor data.

DETAILED DESCRIPTION OF THE INVENTION

Technical Solution

The present invention provides a method and a device for obtaining state data indicating a state of a user, based on sensor data obtained by a sensor. Specifically, the present invention provides a method and a device for obtaining state data even when a noise is included in sensor data or sensor data is not obtained.

Advantageous Effects of the Invention

According to an embodiment, it is possible to effectively obtain state data indicating a state of a user even when a noise is included in sensor data or the sensor data is not acquired.

BEST MODE

Figure 1:
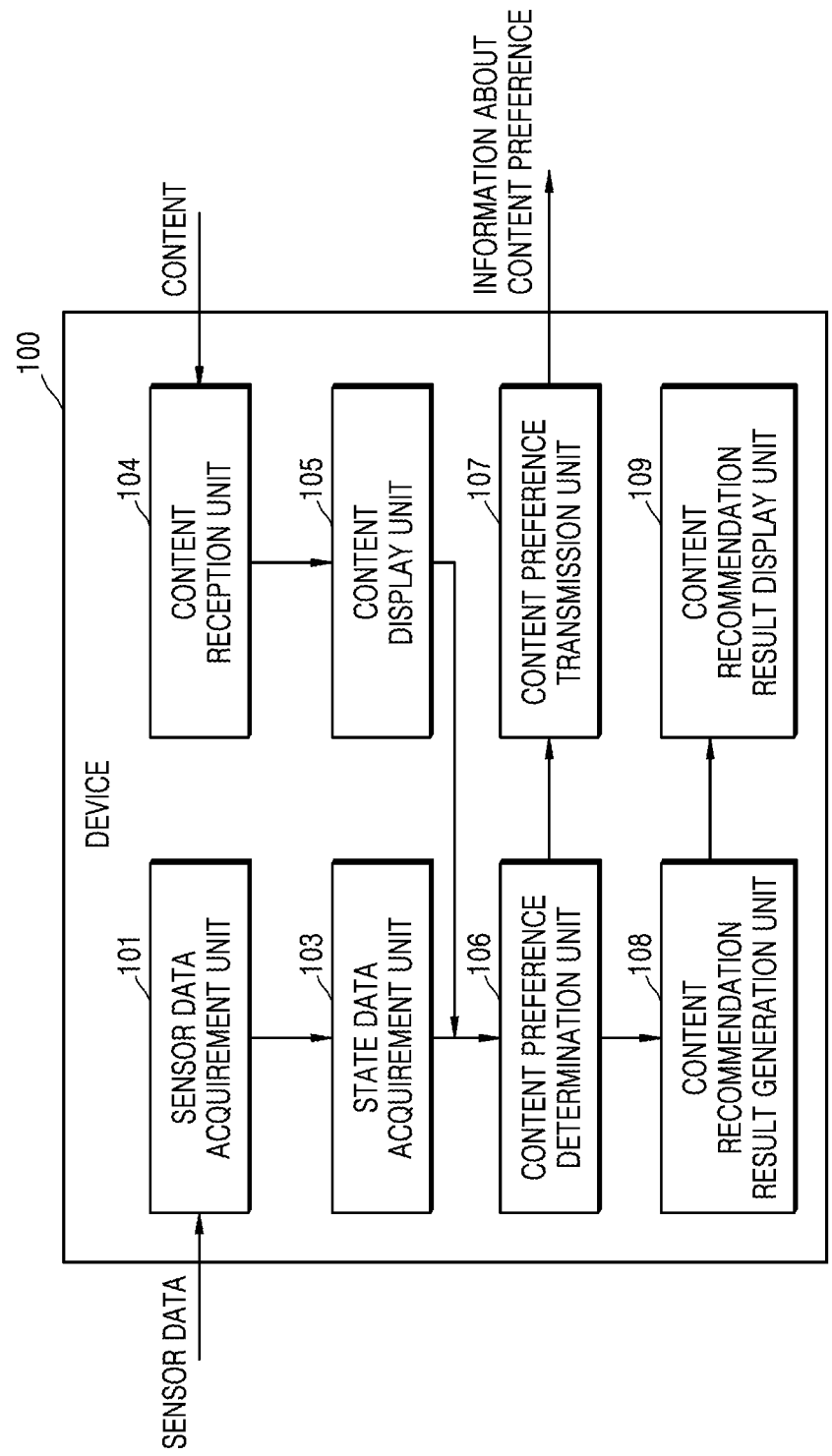
FIG. 1 is a block diagram of an internal structure of a device, according to an embodiment.

According to an embodiment, a method of obtaining state data indicating a state of a user includes: obtaining estimation models including information for obtaining pieces of state data existing in a plurality of layers from sensor data including information obtained by a sensor; obtaining at least one piece of sensor data; obtaining state data of a lower layer from the at least one piece of sensor data, based on the estimation models; and obtaining state data of a higher layer from the state data of the lower layer, based on the estimation models.

In addition, the method may further include: calculating preference of the user for content, based on the obtained state data; and selecting at least one content to be recommended to the user, based on the preference of the user for the content.

In addition, the obtaining of the state data of the lower layer may include determining at least one of a reliability value and a state value for the state data of the lower layer, based on a degree of inclusion of a noise in the sensor data.

In addition, the obtaining of the state data of the higher layer may include determining a state value of the state data of the higher layer, based on the reliability value of the state data of the lower layer.

In addition, the method may further include: obtaining a prediction model including information for obtaining state data at a certain time point from state data at a previous time point; obtaining the state data at a certain time point from state data at at least one time point, based on the prediction model; and correcting the state data obtained by the estimation model, by using the obtained state data.

In addition, the at least one piece of sensor data may include information about the degree of inclusion of the noise, and the obtaining of the state data of the higher layer may includes: selecting at least one estimation model from the obtained estimation models, based on the information about the degree of inclusion of the noise in the data sensor; and obtaining state data of a higher layer from the state data of the lower layer, based on the selected at least one estimation model.

In addition, the selecting of the estimation model may include: determining the state data of the lower layer in which a noise is included, based on information about whether the sensor data includes a noise; and selecting an estimation model that does not include the state data of the lower layer in which the noise is included.

In addition, the method may further include displaying or outputting information about a service to be provided to the user, based on at least one of the obtained state data of the lower layer and the obtained state data of the higher layer.

According to an embodiment, a device for obtaining state data indicating a state of a user includes a sensor configured to obtain at least one piece of sensor data; a controller configured to obtain an estimation model including information for obtaining pieces of state data existing in a plurality of layers from the sensor data, obtain state data of a lower layer from the at least one piece of sensor data, based on the estimation model, and obtain state data of a higher layer from the state data of the lower layer, based on the estimation model; and a display configured to display information about a service to be provided to the user, based on at least one of the obtained state data of the lower layer and the obtained state data of the higher layer.

MODE OF THE INVENTION

Hereinafter, preferred embodiments of the present invention will be described in detail with reference to the accompanying drawings. However, in the following descriptions and the accompanying drawings, descriptions of well-known functions and constructions will be omitted if they are considered to unnecessarily obscure the gist of the present invention. In addition, the same reference numerals are assigned to the same elements throughout the drawings.

The terms or words used in the specification and claims should not be construed as being limited to general or dictionary meaning and should be construed as meaning and concepts matched with the technical spirit of the present invention based on a principle that the inventors can appropriately define the terms so as to describe their invention in the best way. Therefore, the embodiments described in the present specification and the configurations illustrated in the drawings are merely the most preferred embodiment and do not represent the whole technical spirit of the present invention. Thus, it should be understood that there may be various equivalents and modifications replacing them at the time of filing the present application.

In the accompanying drawings, some elements may be exaggerated, omitted or schematically illustrated. The size of each element does not entirely reflect an actual size. The present invention is not limited to a relative size or spacing illustrated in the accompanying drawings.

It will be understood that terms "comprise", "include", and "have" as used herein specify the presence of stated elements, but do not preclude the presence or addition of one or more other elements. It will be understood that when a region is referred to as being "connected to" or "coupled to" another region, it may be directly connected or coupled to the other region, or may be electrically connected or coupled to the other region, with an intervening region disposed therebetween.

As used herein, the singular forms "a," "an" and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

In addition, the term "unit" as used herein refers to a hardware component such as software or hardware component such as FPGA or ASIC, and "unit" performs certain functions. However, "unit" is not limited to software or hardware. A "unit" may be configured in an addressable storage medium or to reproduce one or more processors. Thus, for example, a "unit" includes components, such as software components, object-oriented software components, class components, and task components, processes, functions, attributes, procedures, subroutines, segments of programs codes, drivers, firmware, microcodes, circuits, data, databases, data structures, tables, arrays, and variables. Functions provided in the components and the "units" may be combined with a smaller number of components and "units" or may be separated from additional components and "units."

The embodiments of the present invention will be described with reference to the accompanying drawings in such a manner that the embodiments may be easily carried out by those of ordinary skill in the art. However, the present invention may be implemented in various forms and is not limited to the embodiments. Parts having no relation to descriptions are omitted for clearly describing the present invention Like reference numerals are assigned to like elements throughout the specification.

The preferred embodiments of the present invention will be described below with reference to the accompanying drawings.

FIG. 1 is a block diagram of an internal structure of a device, according to an embodiment.

The device 100 according to the present embodiment may obtain state data indicating a state of a user based on sensor data obtained by a sensor. Also, the device 100 may obtain preference information of the user for content which is being output based on the state data. The device 100 may select content to be recommended to the user based on the preference information and provide the user with information about the selected content to be recommended. The device 100 is not limited to the above-described example, and may provide the user with various services in consideration of the state of the user by using the state data of the user.

The device 100 according to the present embodiment may be various types of terminal devices available by the user. Examples of the device 100 may include a personal computer (PC), a notebook computer, a mobile phone, a tablet PC, a navigation terminal, a smart phone, a smart watch, a smart band, a smart glass, a wearable device, a personal digital assistant (PDA), a portable multimedia player (PMP), and a digital broadcast receiver. The device 100 is not limited to the above-described example, and may include various types of devices which have been developed and commercialized at present, or will be developed in the future.

Referring to FIG. 1, the device 100 may include a sensor data acquirement unit 101, a state data acquirement unit 103, a content reception unit 104, a content display unit 105, a content preference determination unit 106, a content preference transmission unit 107, a content recommendation result generation unit 108, and a content recommendation result display unit 109.

The sensor data acquirement unit 101 may obtain the sensor data including information about a result of sensing by the sensor. The sensor may sense the user or surrounding environment of the user and generate a result of sensing as the sensor data. For example, the sensor data may be generated by various types of devices capable of sensing surrounding environment, such as a camera, a microphone, a smart phone, a wearable device, a tablet PC, or a PC. An ultraviolet sensor may sense the position of a certain object or the presence or absence of the certain object. A position recognition sensor may obtain position information of a terminal device equipped with the position recognition sensor. An acceleration sensor may obtain information about an operation of a terminal device equipped with the acceleration sensor. The camera may generate image data obtained by photographing external environment. The microphone may generate acoustic data obtained by recording the sound generated in the external environment. The sensor data is not limited thereto, and may include information about the user or the surrounding environment of the user, which is obtained by various types of sensors. The various types of sensors, for example, an ultraviolet sensor, a position recognition sensor such as a global positioning system (GPS), an acceleration sensor, a microphone, and a camera, may be included in a terminal device available by the user, such as a smart phone, a wearable device, a tablet PC, or a PC, and may generate the sensor data. Also, the sensors of the above-described example may be included in the device 100.

In addition, the sensor data may further include information about a degree of a noise included in the information sensed by the sensor. The information about the noise may be determined according to an operation state of the sensor or a value of the sensor data. Therefore, the device 100 may obtain the state data of the user based on the information about the noise in the sensor data.

The state data acquirement unit 103 may obtain state data of a lower layer by using one or more pieces of sensor data. Also, the state data acquirement unit 103 may obtain state data of an intermediate layer or a higher layer by using the one or more pieces of state data of the lower layer. For example, state data for the front view degree of a face may be obtained based on at least one of image data photographed by the camera or audio data recorded by the microphone. The state data acquirement unit 103 may obtain state data including information about in which direction a face of the user is directed, based on at least one of the face of the user and a face direction, which are recognized through the image data, and a voice volume and a voice direction which are included in the audio data. Also, the state data acquirement unit 103 may obtain state data about a concentration degree, an interest degree, a fatigue degree, or the like of the user, which belong to the intermediate or higher layer, by using the state data for the front view degree of the face.

The state data of the lower layer may be obtained from one or more pieces of sensor data. Also, the state data of the intermediate or higher layer may be obtained from the state data of the lower layer. The state data of a certain layer is not limited thereto, and may be obtained from another type of state data of the same layer or state data of a higher layer. The state data acquirement unit 103 may obtain state data of each layer by using an estimation model including information for obtaining state data from the sensor data. The state data acquirement unit 103 may obtain state data of the user from the state data of a lower layer to the state data of a higher layer, by using the estimation model.

The content reception unit 104 may receive content from the outside. For example, the content reception unit 104 may receive the content through networks or ground waves. Alternatively, the content reception unit 104 may load content stored in a memory of the device 100 without receiving content from the outside. The content which is received from the outside or is loaded may be provided to the user by the content display unit 105.

The content display unit 105 may display the content received by the content reception unit 104 through a display. When the content includes an audio signal, the content display unit 105 may output the content through a speaker. The content display unit 105 may transfer information about content, which is being displayed, to the content preference determination unit 106. The content preference determination unit 106 may calculate content preference of the user by using the information about the content which is being displayed.

The content preference determination unit 106 may calculate the content preference of the user by using the state data obtained by the state data acquirement unit 103. For example, the content preference determination unit 106 may determine a preference value for content corresponding to the state data, in proportion to an interest degree value and a concentration degree value among the state data of the user. Information about the content preference of the user, which is determined by the content preference determination unit 106, may be transmitted to the outside by the content preference transmission unit 107. The information about the content preference transmitted to the outside may be used to provide an advertisement or service to the user in an external device. The information about the preference of the user is not limited thereto, and may be used to provide an advertisement or service to the user in the device 100.

The content recommendation result generation unit 108 may generate information about content to be recommended to the user based on the information about the content preference of the user. For example, the content recommendation result generation unit 108 may grasp characteristics of a genre, actors, a film producer, or the like of content of which the preference is high. The content recommendation result generation unit 108 may select content having similar characteristics to the grasped characteristics and generate information about content selected as content to be recommended to the user.

The content recommendation result display unit 109 may display the information about the content to be recommended to the user, which is generated by the content recommendation result generation unit 108, through the display. Alternatively, the content recommendation result display unit 109 may output the information about the content to be recommended to the user through various methods, such as voice or vibration.

Figure 2:
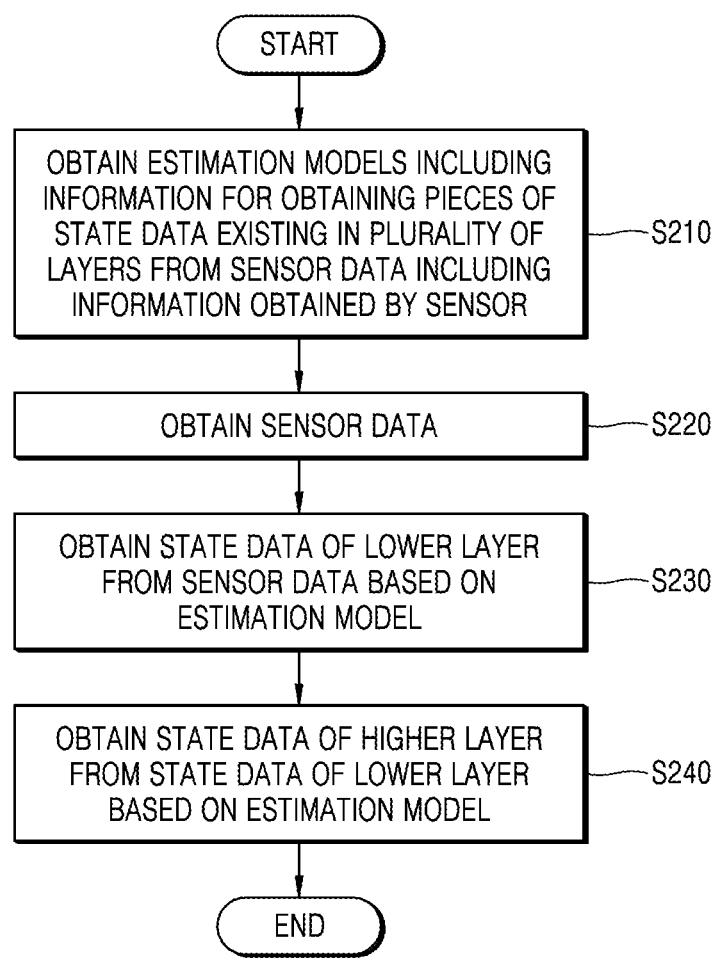
FIG. 2 is a flowchart of a method of obtaining state data, according to an embodiment.

FIG. 2 is a flowchart of a method of obtaining state data, according to an embodiment. Referring to FIG. 2, in operation S210, the device 100 may acquire, from sensor data, an estimation model including information for obtaining pieces of state data included in a plurality of layers. The estimation model may include information about which data is based to obtain each of the pieces of state data. The device 100 may obtain the pieces of state data of the layers from the sensor data by using the estimation model.

In operation S220, the device 100 may obtain the sensor data. The sensor data may be obtained by a sensor provided inside or outside the device 100. The sensor data may include information about a user or surrounding environment of the user.

In operation S230, the device 100 may obtain state data of a lower layer from the sensor data, based on the estimation model obtained in operation S210. The state data of the lower layer may include state data which may be directly obtained from the sensor data. The state data of the lower layer may be obtained from one or more pieces of sensor data, and a value of the state data may be determined according to whether the sensor data includes a noise.

The state data may include a state value indicating a degree of the state of the user and a reliability value indicating a degree of reliability for the state value. The state value and the reliability value may be determined according to a degree of inclusion of a noise in the sensor data. For example, a state value for the front view degree of a face may be determined as a value between 0 and 1 indicating a face direction based on at least one of the image data photographed by the camera and the audio data recorded by the microphone. A value in the range of 0 to 1, indicating the face direction recognized through the image data and a voice direction recognized through the audio data, may be determined. The state value for the front view degree of the face may be determined based on a face direction value and a voice direction value, according to a reliability value and a weight value of each sensor data. The weight value of the sensor data may be determined according to influence of the sensor data on the state data. As the reliability value or the weight value of the sensor data increases, the sensor data is more highly reflected to the state value.

Also, a reliability value for the front view degree of the face may be determined according to at least one of a degree of inclusion of a noise in each sensor data and a weight value of the each sensor data. The degree of inclusion of the noise in the sensor data may be determined based on an operation state of the sensor by which the sensor data is acquired, a value of the sensor data, or the like. For example, the degree of inclusion of the noise may be determined according to whether a certain attribute value of the sensor data is in a predefined range. Also, the weight value of the sensor data may be determined according to how much the sensor data is associated with each state data. Therefore, the weight value of the sensor data may include different values for pieces of state data.

In operation S240, the device 100 may obtain state data of a higher layer from the state data of the lower layer, based on the estimation model obtained in operation S210. The state data of the higher layer may be obtained from the state data of the lower layer, which is obtained based on the sensor data. The state data of the higher layer may include a state value and a reliability value, similarly to the state data of the lower layer. The state data of the higher layer may include a state value and a reliability value, obtained based on the state value and the reliability value of the lower layer.

Therefore, since the device 100 acquires the state data of the lower layer in consideration of the degree of inclusion of the noise in the sensor data, it is possible to efficiently obtain the state data even when the noise is included in the sensor data.

Also, the device 100 may display information about a service to be provided to the user through a display, or output the information about the service to be provided to the user as vibration or sound through a vibrator or a speaker, based on the state data of the layers.

Figure 3:
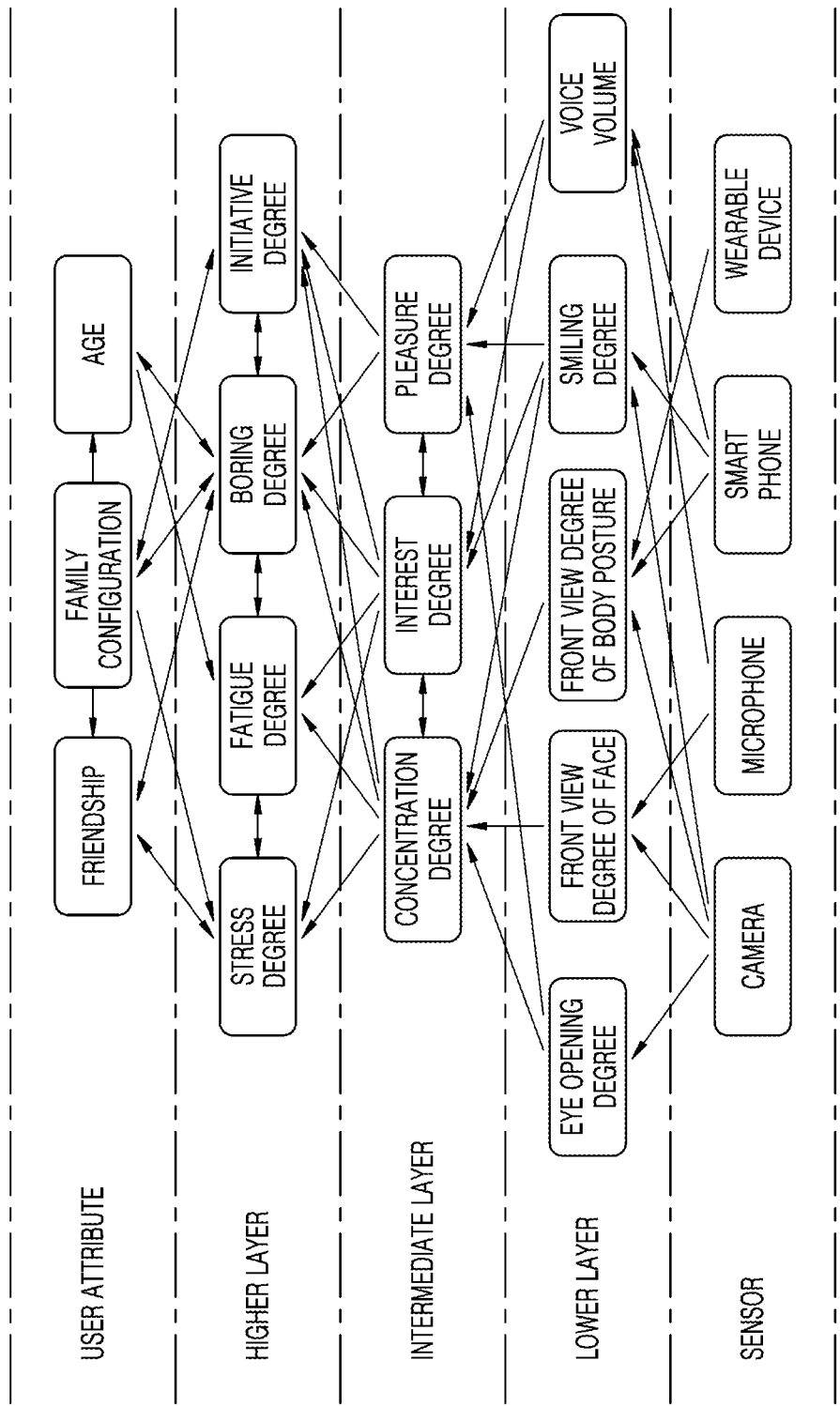
FIG. 3 is a diagram illustrating an example of an estimation model, according to an embodiment.

FIG. 3 is a diagram illustrating an example of an estimation model, according to an embodiment.

Referring to FIG. 3, the estimation model may include information about state data or sensor data used to obtain each piece of state data. In the graph of FIG. 3, a value of a connection destination may be determined according to a value of a connection source of an arrow.

A device for generating an estimation model may ask the user a question or collect information about the user and generate an estimation model as in FIG. 3 based on data associated with each node. For example, the device for generating an estimation model may receive a feedback of the user with respect to an interest degree determined based on a smiling degree and a voice volume of the user. A weight value to be applied to the smiling degree and the voice volume of the user may be determined based on the feedback of the user. An estimation model for the user may be generated by a mechanical learning algorithm based on the collected information. The estimation model may be generated for each user, but is not limited thereto. A previously generated estimation model from the outside may be used. The device for generating an estimation model may be the device 100 or an external device.

Sensor data obtained by a sensor may be included in a sensor layer. Referring to FIG. 3, sensor data obtained by a camera, a microphone, a smart phone, or a wearable device, may be included in the sensor.

State data which may be obtained by performing primary processing on the sensor data may be included in a lower layer. For example, pieces of state data, such as an eye opening degree, a front view degree of a face, a front view degree of a body posture, or a smiling degree, may be obtained from the image data obtained by the camera. State values of the pieces of state data may be determined as a value between 0 and 1.

State data which may be obtained from the state data of the lower layer may be included in an intermediate layer. For example, pieces of state data, such as a concentration degree, an interest degree, and a pleasure degree with respect to content, may be obtained from the state data of the lower layer or pieces of state data of the same layer. In a case where the concentration degree with respect to the content is high, there is a high possibility that the interest degree is also high. Therefore, the state data, such as the concentration degree or the interest degree may be obtained by referring to each other.

State data which may be obtained from the state data of the intermediate layer or the lower layer may be included in a higher layer. As the layer of the state data becomes higher, a relationship with the sensor data may become weak. Therefore, the state data of the higher layer may be obtained from state data of another layer, rather than being directly derived from the sensor data. Also, the state data of the higher layer may be obtained based on the sensor data obtained by a sensor separately provided for the state data. State data, such as a stress degree, a fatigue degree, a boring degree, or an initiative degree, may be included in the higher layer.

The state data of the intermediate layer or the state data of the higher layer may indicate the user's subjective emotion. Therefore, an estimation model for the intermediate layer or the higher layer may be generated based on a result of a survey performed on the user or data obtained from a dedicated sensor separately provided.

State data indicating a user attribute may be included in a user attribute layer. For example, state data for friendship, family configuration, age, or the like may be included. The state data of the user attribute layer may be determined based on information collected with respect to the user.

The state data of the higher layer may be determined based on the state data of the user attribute layer. For example, older users are likely to easily get tired or boring. Therefore, state data for the fatigue degree or the boring degree of the higher layer may be determined based on state data for ages of user attributes.

Figure 4:
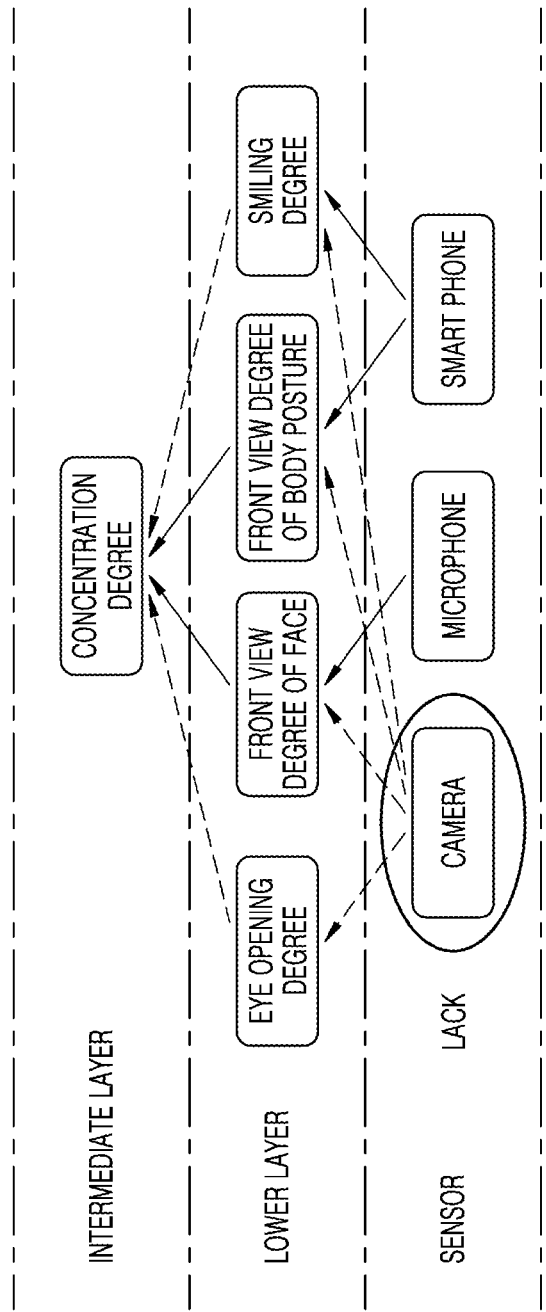
FIG. 4 is a diagram illustrating an example of obtaining state data when partial sensor data is omitted, according to an embodiment.

FIG. 4 is a diagram illustrating an example of obtaining state data when partial sensor data is omitted, according to an embodiment.

Referring to FIG. 4, image data which may be obtained by a camera may be omitted from the sensor data, according to an operation state of the camera. Therefore, the state data for an eye opening degree, which may be obtained by the camera may not be acquired, but the other state data of the lower layer may be obtained based on sensor data of a microphone and a smart phone. Also, the state data for the concentration degree in the intermediate layer may be obtained based on the other state data of the lower layer than the state data for the eye opening degree.

Accordingly, the device 100 may obtain the state data based on the other sensor data according to the estimation model even when a value of partial sensor data is omitted.

A method of obtaining state data will be described below in detail with reference to FIGS. 5 to 11.

Figure 5:
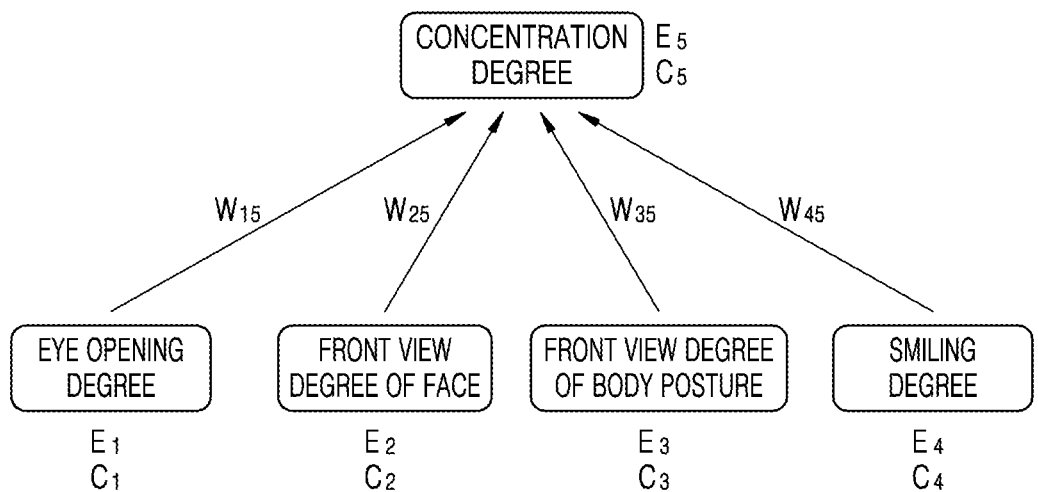
FIG. 5 is a diagram illustrating an example of obtaining state data based on other state data, according to an embodiment.

FIG. 5 is a diagram illustrating an example of obtaining state data based on other state data, according to an embodiment.

Referring to FIG. 5, the state data for the concentration degree may be obtained from four pieces of state data. $E_i$ denotes a state value of i-th state data and $C_i$ denotes reliability of i-th state data. $E_i$ and $C_i$ values included in the state data for the concentration degree may be calculated as expressed in Equations 1 and 2 below.

$$E_i = \frac{\sum_{j=1}^{N} W_{ji} C_j E_j}{\sum_{j=1}^{N} W_{ji} C_j}, i \neq j \quad \text{[Equation 1]}$$

$$C_i = \frac{\sum_{j=1}^{N} W_{ji} C_j}{\sum_{j=1}^{N} W_{ji}}, i \neq j \quad \text{[Equation 2]}$$

In Equations 1 and 2, $W_{ji}$ denotes a weight value to be applied to j-th state data so as to calculate i-th state data. The weight value may be a value in the range of 0 to 1. N denotes the total number of pieces of state data to be used to calculate i-th state data. Hereinafter, an i-th piece of state data may be referred to as "i-th state data" for convenience.

$E_5$ and $C_5$, which are respectively a state value and a reliability value included in the state data for the concentration degree, may be obtained as expressed in Equations 3 and 4 below.

$$E_5 = \frac{\sum_{j=1}^{4} W_{j5} C_j E_j}{\sum_{j=1}^{4} W_{j5} C_j} = \quad \text{[Equation 3]}$$

$$\frac{W_{15} C_1 E_1 + W_{25} C_2 E_2 + W_{35} C_3 E_3 + W_{45} C_4 E_4}{W_{15} C_1 + W_{25} C_2 + W_{35} C_3 + W_{45} C_4}$$

$$C_5 = \frac{\sum_{j=1}^{4} W_{j5} C_j}{\sum_{j=1}^{4} W_{j5}} = \frac{W_{15} C_1 + W_{25} C_2 + W_{35} C_3 + W_{45} C_4}{W_{15} + W_{25} + W_{35} + W_{45}} \quad \text{[Equation 4]}$$

FIGS. 6 to 11 are diagrams illustrating an example of obtaining state data, according to an embodiment.

Figure 6:
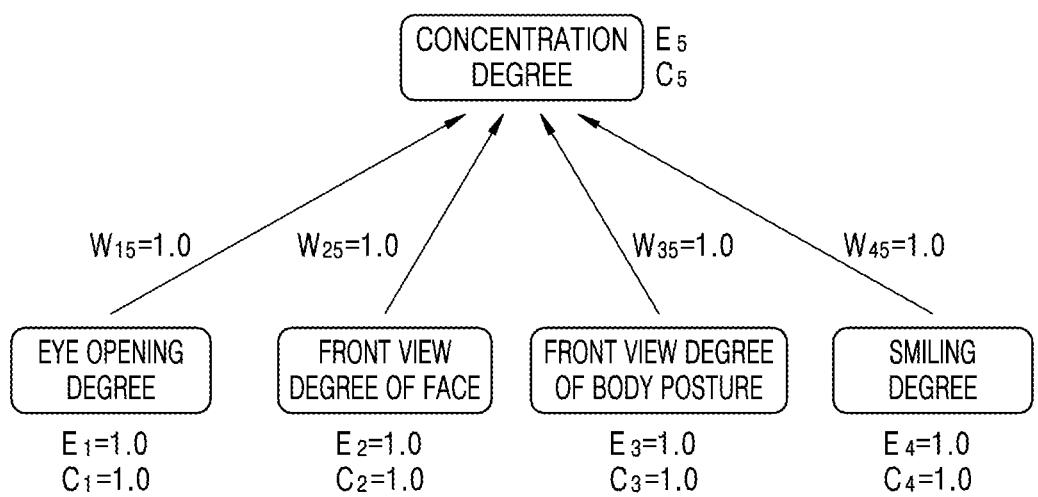
FIGS. 6 to 11 are diagrams illustrating examples of obtaining state data, according to an embodiment.

Referring to FIG. 6, $E_5$ and $C_5$, which are respectively a state value and a reliability value included in the state data for the concentration degree (fifth state data), may be obtained as expressed in Equations 5 and 6 below.

$$E_5 = \frac{\sum_{j=1}^{4} W_{j5} C_j E_j}{\sum_{j=1}^{4} W_{j5} C_j} = \frac{1.0 + 1.0 + 1.0 + 1.0}{1.0 + 1.0 + 1.0 + 1.0} = 1.0 \quad \text{[Equation 5]}$$

$$C_5 = \frac{\sum_{j=1}^{4} W_{j5} C_j}{\sum_{j=1}^{4} W_{j5}} = \frac{1.0 + 1.0 + 1.0 + 1.0}{1.0 + 1.0 + 1.0 + 1.0} = 1.0 \quad \text{[Equation 6]}$$

As illustrated in FIG. 6, since the weight values of first to fourth state data are 1, the first to fourth state data have strong influence on the fifth state data. Also, since the reliability values of the first to fourth state data are 1, the values of the first to fourth state data have high reliability. Therefore, a state value and a reliability value of the fifth state data may be determined as 1 that is the maximum value.

Figure 7:
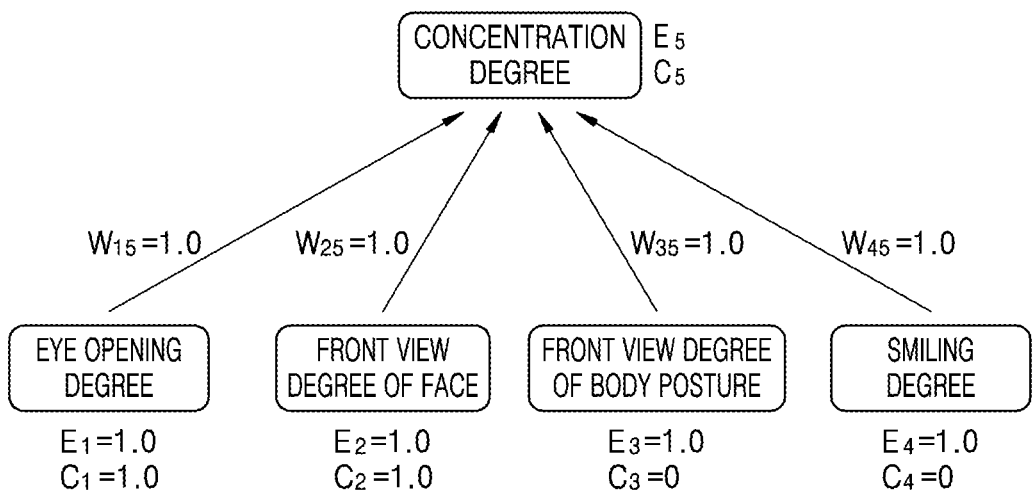

Referring to FIG. 7, $E_5$ and $C_5$, which are respectively a state value and a reliability value included in the state data for the concentration degree (fifth state data), may be obtained as expressed in Equations 7 and 8 below.

$$E_5 = \frac{\sum_{j=1}^{4} W_{j5} C_j E_j}{\sum_{j=1}^{4} W_{j5} C_j} = \frac{1.0 + 1.0 + 0 + 0}{1.0 + 1.0 + 0 + 0} = 1.0 \quad \text{[Equation 7]}$$

$$C_5 = \frac{\sum_{j=1}^{4} W_{j5} C_j}{\sum_{j=1}^{4} W_{j5}} = \frac{1.0 + 1.0 + 0 + 0}{1.0 + 1.0 + 1.0 + 1.0} = 0.5 \quad \text{[Equation 8]}$$

As illustrated in FIG. 7, since the weight values of the first to fourth state data are 1, the first to fourth state data have strong influence on the fifth state data. Also, since the reliability values of the first and second state data are 1, the values of the first and second state data have high reliability. However, since the reliability values of the third and fourth state data are 0, the values of the third and fourth state data have low reliability. For example, when a sensor capable of obtaining the third and fourth state data cannot operate or is in a non-operating state, the reliability values thereof may be determined as 0.

The state value of the fifth state data may be determined as 1 according to the values of the first and second state data of which the reliability is high. However, since the reliability of the third and fourth state data having strong influence on the fifth state data is low, the reliability value of the fifth state data may be determined as 0.5.

With respect to the fifth state data (concentration degree), it is possible to comment that "the concentration degree is high since the eyes are opened wide and the face looks forwards", because the state value may be determined according to the values of the first and second state data of which the reliability is high. The comment for the fifth state data may be displayed on the display so as to provide the comment to the user.

Figure 8:
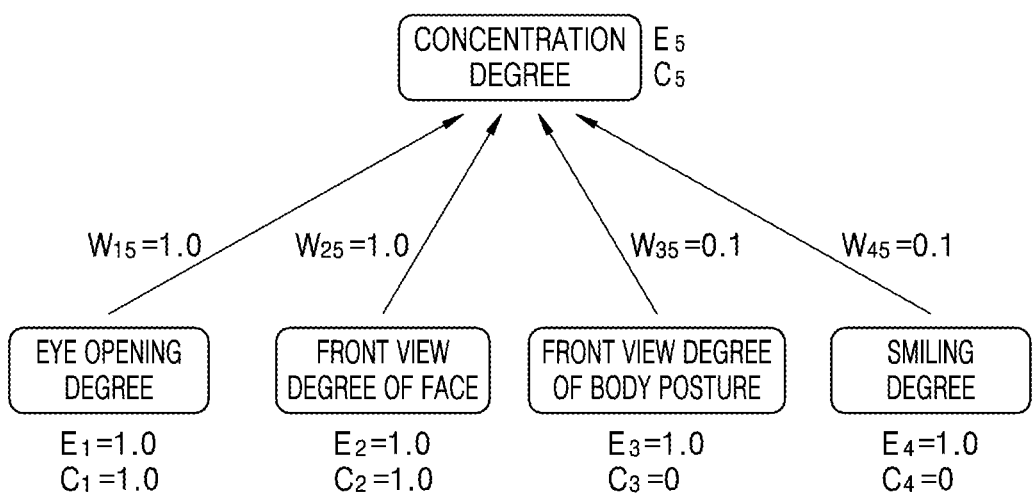

Referring to FIG. 8, $E_5$ and $C_5$, which are respectively a state value and a reliability value included in the state data for the concentration degree (fifth state data), may be obtained as expressed in Equations 9 and 10 below.

$$E_5 = \frac{\sum_{j=1}^{4} W_{j5} C_j E_j}{\sum_{j=1}^{4} W_{j5} C_j} = \frac{1.0 + 1.0 + 0 + 0}{1.0 + 1.0 + 0 + 0} = 1.0 \quad \text{[Equation 9]}$$

$$C_5 = \frac{\sum_{j=1}^{4} W_{j5} C_j}{\sum_{j=1}^{4} W_{j5}} = \frac{1.0 + 1.0 + 0 + 0}{1.0 + 1.0 + 0.1 + 0.1} = 0.91 \quad \text{[Equation 10]}$$

As illustrated in FIG. 8, since the weight values of the first and second state data are 1, the first and second state data have strong influence on the fifth state data. However, since the weight values of the third and fourth state data are 0.1, the third and fourth state data have weak influence on the fifth state data. Also, since the reliability values of the first and second state data are 1, the values of the first and second state data have high reliability. However, since the reliability values of the third and fourth state data are 0, the values of the third and fourth state data have low reliability.

The state value of the fifth state data may be determined as 1 according to the values of the first and second state data of which the reliability is high. Since the third and fourth state data have weak influence on the fifth state data although the reliability of the third and fourth state data is low, the reliability value of the fifth state data may be determined as 0.91 that is a high value.

Figure 9:
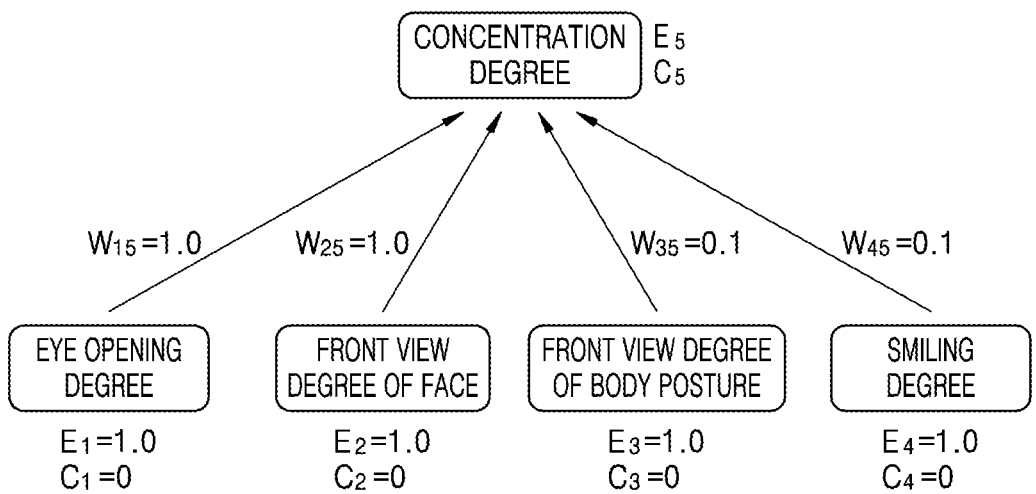

Referring to FIG. 9, $E_5$ and $C_5$, which are respectively a state value and a reliability value included in the state data for the concentration degree (fifth state data), may be obtained as expressed in Equations 11 and 12 below.

$$E_5 = \frac{\sum_{j=1}^{4} W_{j5} C_j E_j}{\sum_{j=1}^{4} W_{j5} C_j} = \frac{0 + 0 + 0 + 0.1}{0 + 0 + 0 + 0.1} = 1.0 \quad \text{[Equation 11]}$$

$$C_5 = \frac{\sum_{j=1}^{4} W_{j5} C_j}{\sum_{j=1}^{4} W_{j5}} = \frac{0 + 0 + 0 + 0.1}{1.0 + 1.0 + 0.1 + 0.1} = 0.05 \quad \text{[Equation 12]}$$

As illustrated in FIG. 9, since the weight values of the first and second state data are 1, the first and second state data have strong influence on the fifth state data. However, since the weight values of the third and fourth state data are 0.1, the third and fourth state data have weak influence on the fifth state data. Also, since the reliability values of the first to third state data are 0, the values of the first to third state data have low reliability. However, since the reliability value of the fourth state data is 1, the value of the fourth state data has high reliability.

The state value of the fifth state data may be determined as 1 according to the value of the fourth state data of which the reliability is high. However, since only the value of the fourth state data having weak influence on the fifth state data has high reliability, the reliability value of the fifth state data may be determined as 0.05 that is a low value.

Figure 10:
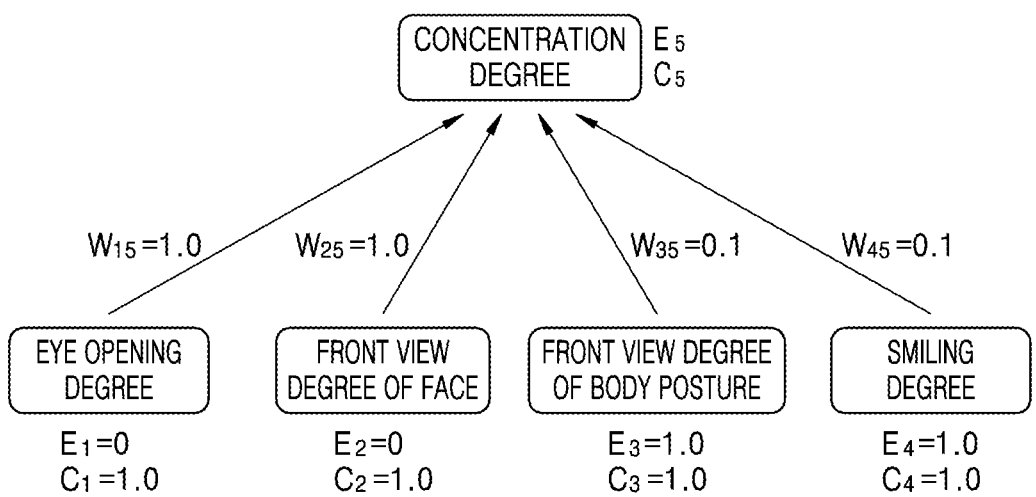

Referring to FIG. 10, $E_5$ and $C_5$, which are respectively a state value and a reliability value included in the state data for the concentration degree (fifth state data), may be obtained as expressed in Equations 13 and 14 below.

$$E_5 = \frac{\sum_{j=1}^{4} W_{j5} C_j E_j}{\sum_{j=1}^{4} W_{j5} C_j} = \frac{0 + 0 + 0.1 + 0.1}{1.0 + 1.0 + 0.1 + 0.1} = 0.09 \quad \text{[Equation 13]}$$

$$C_5 = \frac{\sum_{j=1}^{4} W_{j5} C_j}{\sum_{j=1}^{4} W_{j5}} = \frac{1.0 + 1.0 + 0.1 + 0.1}{1.0 + 1.0 + 0.1 + 0.1} = 1.0 \quad \text{[Equation 14]}$$

As illustrated in FIG. 10, since the weight values of the first and second state data are 1, the first and second state data have strong influence on the fifth state data. However, since the weight values of the third and fourth state data are 0.1, the third and fourth state data have weak influence on the fifth state data. Also, since the reliability values of the first to fourth state data are 1, the values of the first to fourth state data have high reliability.

Since the values of the first to fourth state data all have high reliability, the state value of the fifth state data may be determined as 0.09 according to the values of the first and second state data having strong influence. Since the values of the first to fourth state data all have high reliability, the reliability value of the fifth state data may be determined as 1 that is a high value.

With respect to the fifth state data (concentration degree), it is possible to comment that "the concentration degree is low since the eyes are almost closed and the face looks into the distance not forwards, in that the state value may be determined according to the values of the first and second state data having strong influence.

Figure 11:
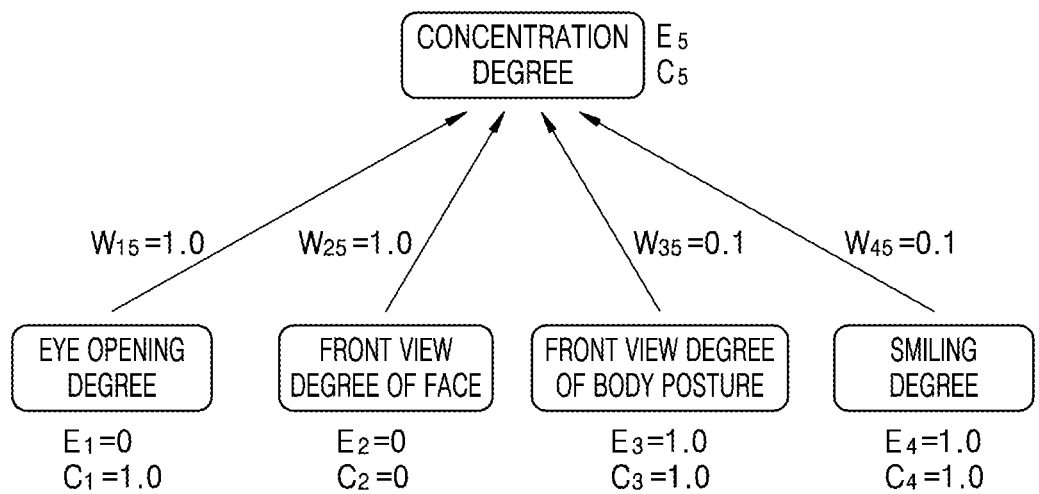

Referring to FIG. 11, $E_5$ and $C_5$, which are respectively a state value and a reliability value included in the state data for the concentration degree (fifth state data), may be obtained as expressed in Equations 15 and 16 below.

$$E_5 = \frac{\sum_{j=1}^{4} W_{j5} C_j E_j}{\sum_{j=1}^{4} W_{j5} C_j} = \frac{0 + 0 + 0.1 + 0.1}{1.0 + 0 + 0.1 + 0.1} = 0.17 \quad \text{[Equation 15]}$$

$$C_5 = \frac{\sum_{j=1}^{4} W_{j5} C_j}{\sum_{j=1}^{4} W_{j5}} = \frac{1.0 + 0 + 0.1 + 0.1}{1.0 + 1.0 + 0.1 + 0.1} = 0.55 \quad \text{[Equation 16]}$$

As illustrated in FIG. 11, since the weight values of the first and second state data are 1, the first and second state data have strong influence on the fifth state data. However, since the weight values of the third and fourth state data are 0.1, the third and fourth state data have weak influence on the fifth state data. Also, since the reliability values of the first, third, and fourth state data are 1, the values of the first, third, and fourth state data have high reliability. However, since the reliability value of the second state data is 0, the value of the second state data has low reliability.

The state value of the fifth state data may be determined as 0.17 according to the values of the first and second state data having strong influence. Since the influence of the second state data having a low state value decreases is lowered the reliability of the second state data is low, the state value of the fifth state data of FIG. 11 may be determined as a value larger than the state value of the fifth state data of FIG. 10. Also, since the reliability of the second state data having a high weight is low, the reliability value of the fifth state data of FIG. 11 may be determined as 0.55 that is a value smaller than the reliability value of the fifth state data of FIG. 10. Therefore, when the weight of state data having low reliability is high among pieces of state data of a connection source, the reliability of state data of a connection destination may be lowered.

A method of obtaining state data at a certain time point based on a prediction model will be described in detail with reference to FIGS. 12 and 13.

Figure 12:
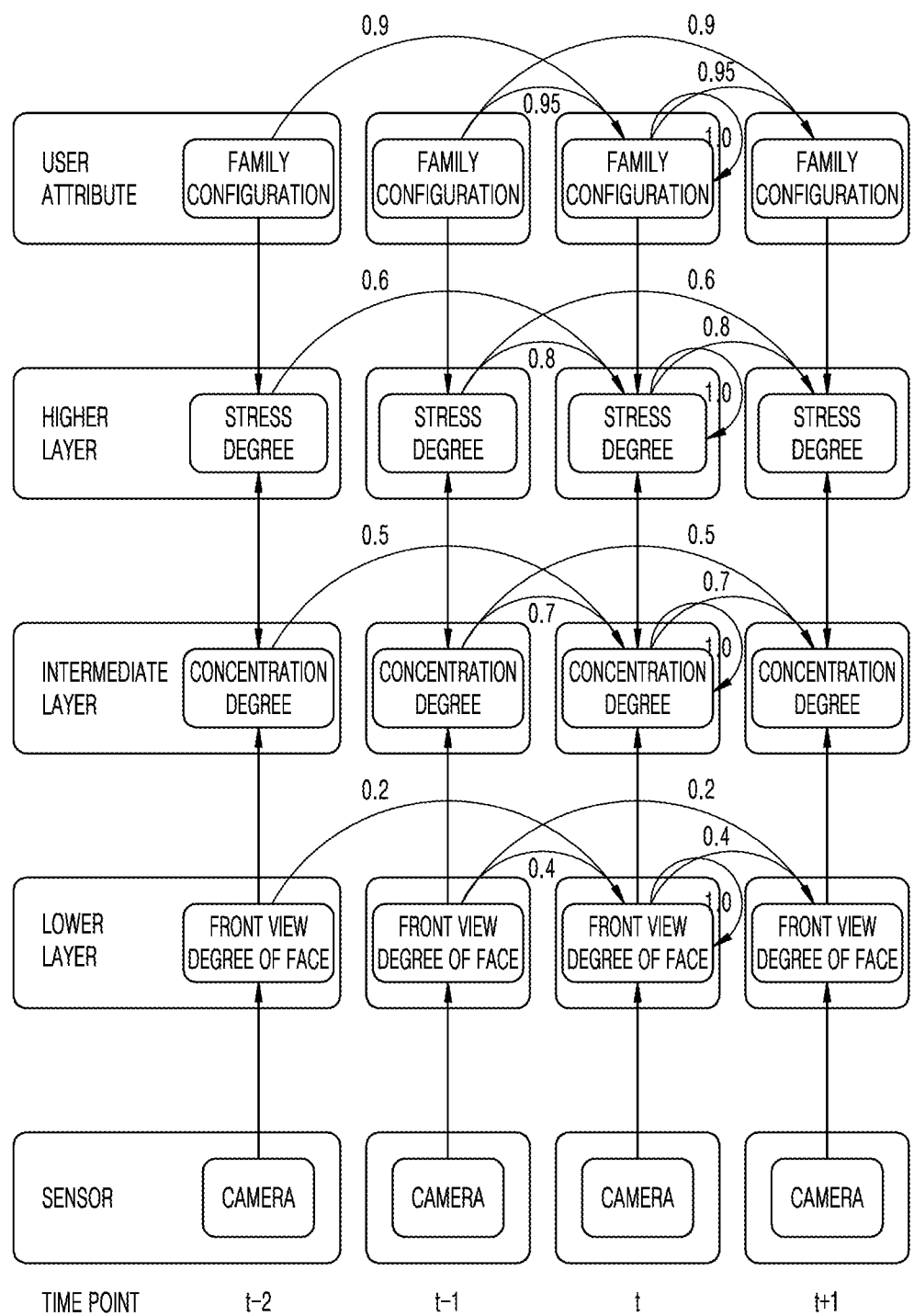
FIG. 12 is a diagram illustrating an example of a prediction model, according to an embodiment.

FIG. 12 is a diagram illustrating an example of a prediction model, according to an embodiment.

Referring to FIG. 12, the prediction model may include information for obtaining state data at a certain time point from state data at a previous time point. In the graph of FIG. 12, a value of a connection destination may be determined according to a value of a connection source of an arrow, and a value written on the arrow indicates a weight value. The state value of state data, which is determined by the prediction model, may be used to correct a state value determined by an estimation model.

Pieces of homogeneous state data at adjacent time points may be similar to one another in that a state of a user continues similarly for a large amount of time. The prediction model may be determined according to a variation in each piece of state data with respect to time. A device for generating a prediction model may collect data associated with each node by asking the user a question or collecting information about the user, like the device for generating the estimation model. The device for generating the prediction model may generate the prediction model based on a result of learning using the collected data. Examples of a learning method may include a parameter learning method by the Bayesian model and an optimal solution determination method by a genetic algorithm.

The prediction model of FIG. 12 may include pieces of homogeneous state data of each layer at time points t−2, t−2, t, and t+1. Also, the prediction model may include information about state data and a weight used to obtain pieces of state data.

A state value $P_t(A)$ of state data A at a time point t, which may be obtained according to the prediction model, may be obtained using Equation 17 below.

$$P_t(A) = \frac{\sum_{k=t-n}^{t} W_{k,t}(A) C_k(A) P_k(A)}{\sum_{k=t-n}^{t} W_{k,t}(A) C_k(A)}$$

[Equation 17]

The device 100 may correct a value E(A) which is a state value obtained by the estimation model using the value $P_t(A)$. For example, the device 100 may correct the state value of the state data A as an average value of $P_t(A)$ and E(A).

A reliability value $C_t(A)$ of the state data A at the time point t may be determined as a reliability value C(A) of the state data A calculated using Equation 2 according to the estimation model.

n denotes a time width which may be referred so as to obtain the state value of the state data A at the time point t. $P_t(A)$ denotes the state value of the state data A at the time point t, and $C_t(A)$ denotes the reliability value of the state data A at the time point t. $W_{k,t}(A)$ denotes a weight value capable of being applied to the state data A at a time point k with respect to the state data A at the time point t.

For example, the device 100 may obtain a state value for the family configuration of the user attribute layer at the time point t, based on state data for the family configuration at the time points t−2 and t−1. The device 100 may calculate a state value for the family configuration at the time point t by using the state data for the family configuration at the time points t−2 and t−1 as expressed in Equation 18 below.

$$P_t = \frac{\sum_{k=t-n}^{t} W_{k,t} C_k P_k}{\sum_{k=t-n}^{t} W_{k,t} C_k} =$$

[Equation 18]

$$\frac{W_{t-2,t} C_{t-2} P_{t-2} + W_{t-1,t} C_{t-1} P_{t-1} + W_{t,t} C_t P_t}{W_{t-2,t} C_{t-2} + W_{t-1,t} C_{t-1} + W_{t,t} C_t}$$

Since, in the prediction model, pieces of state data belonging to the user attribute layer have a low variation with time, the weight value capable of being applied between time points may be determined as a high value. Since a variation with time increases as the lower the layer is, the weight value capable of being applied between time points may be determined as a low value.

Figure 13:
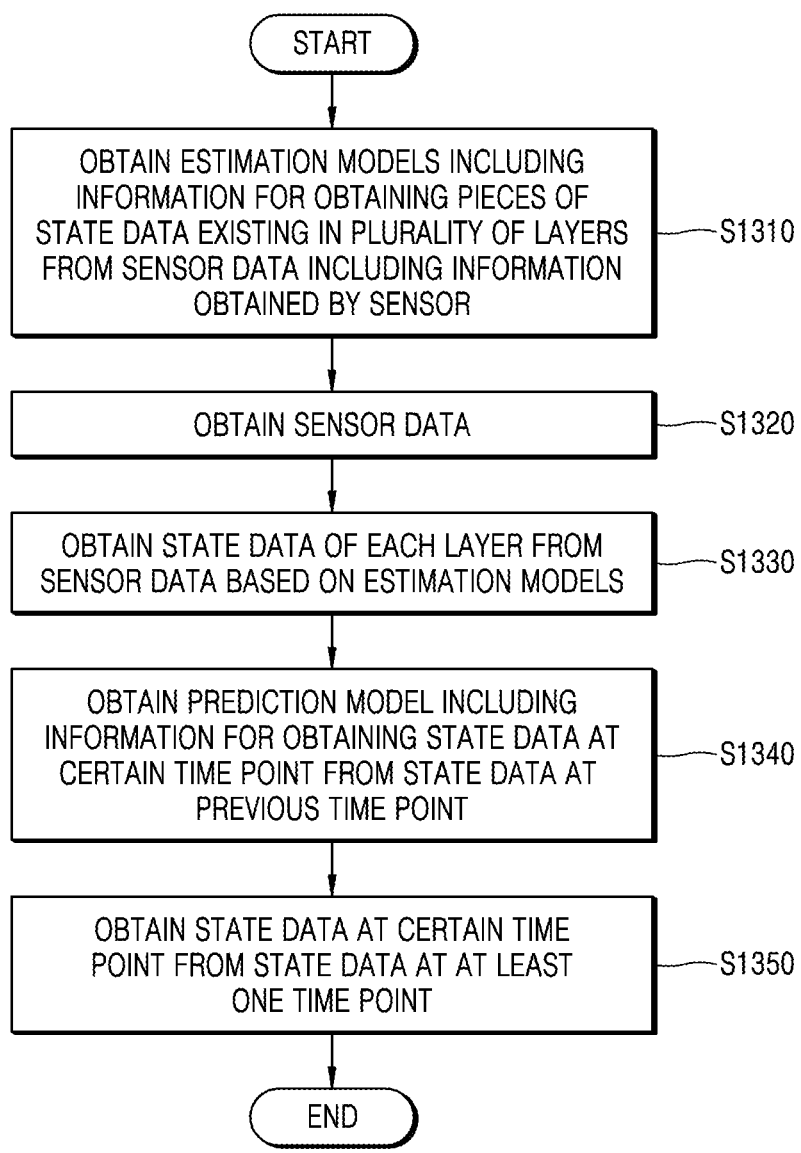
FIG. 13 is a flowchart of a method of obtaining state data at a certain time point based on a prediction model, according to an embodiment.

FIG. 13 is a flowchart of a method of obtaining state data at a certain time point based on a prediction model, according to an embodiment.

Referring to FIG. 13, in operation S1310, the device 100 may acquire, from sensor data, an estimation model including information for obtaining pieces of state data existing in a plurality of layers. In operation S1320, the device 100 may obtain the sensor data. The sensor data may include information obtained by a sensor.

In operation S1330, the device 100 may obtain state data of each layer from the sensor data based on the estimation model. The device 100 may obtain state data of a lower layer from the sensor data or obtain state data of a higher layer from the state data of the lower layer or an intermediate layer. The device 100 may obtain pieces of state data of a user attribute layer so as to obtain the state data of the higher layer according to the estimation model.

In operation S1340, the device 100 may obtain a prediction model including information for obtaining state data at a certain time point from state data at a previous time point. In operation S1350, the device 100 may obtain the state data at the certain time point from state data at at least one time point by using the prediction model. The device 100 may obtain the state data at the certain time point by using state data at another time point, based on the fact that there is similarity between pieces of state data at adjacent time points. The state data at another time point may be the same type of state data as the state data at the certain time point. The device 100 may correct the state data obtained using the estimation model, by using state data obtained using the prediction model.

A method of obtaining state data based on an estimation model selected based on whether sensor data includes a noise will be described below in detail with reference to FIGS. 14 to 16.

Figure 14:
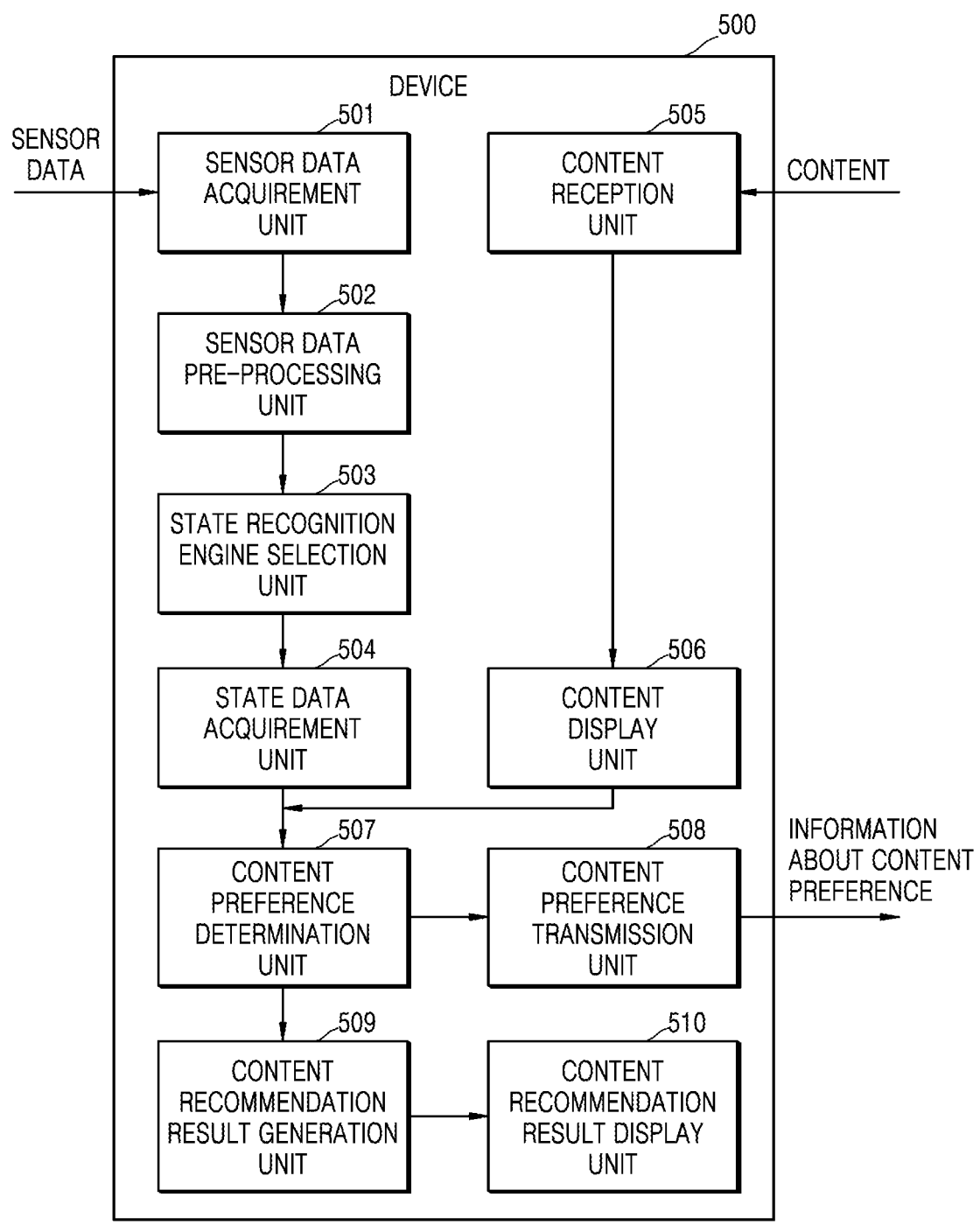
FIG. 14 is a block diagram of an internal structure of a device for obtaining state data, according to an embodiment.

FIG. 14 is a block diagram of an internal structure of a device 500 for obtaining state data, according to an embodiment.

The device 500 of FIG. 14 may correspond to the device 100 of FIG. 1. The device 500 may select an estimation model based on sensor data and obtain state data indicating a state of a user by using the selected estimation model. It is possible to select one or more of a plurality of estimation models based on the sensor data, unlike the device 100 of FIG. 1.

Referring to FIG. 14, the device 500 may include a sensor data acquirement unit 501, a sensor data pre-processing unit 502, a state recognition engine selection unit 503, a state data acquirement unit 504, a content reception unit 505, a content display unit 506, a content preference determination unit 507, a content preference transmission unit 508, a content recommendation result generation unit 509, and a content recommendation result display unit 510.

The sensor data acquirement unit 501, the state data acquirement unit 504, the content reception unit 505, the content display unit 506, the content preference determination unit 507, the content preference transmission unit 508, the content recommendation result generation unit 509, and the content recommendation result display unit 510 in FIG. 14 may correspond to the sensor data acquirement unit 101, the state data acquirement unit 103, the content reception unit 104, the content display unit 105, the content preference determination unit 106, the content preference transmission unit 107, the content recommendation result generation unit 108, and the content recommendation result display unit 109 in FIG. 1. The descriptions provided with reference to FIG. 1 may not be repeated.

The sensor data acquirement unit 501 may obtain sensor data including information about a result of sensing by a sensor. The sensor may sense the user or the surrounding environment of the user and generate a result of sensing as the sensor data. In addition, the sensor data may further include information about a degree of inclusion of a noise in the information sensed by the sensor. Therefore, the device 100 may obtain the state data of the user based on the degree of inclusion of the noise in the sensor data.

The sensor data pre-processing unit 502 may perform pre-processing on the sensor data obtained by the sensor data acquirement unit 501. The sensor data pre-processing unit 502 may extract the information about the degree of inclusion of the noise from sensor data. For example, the sensor data pre-processing unit 502 may determine the degree of inclusion of the noise by analyzing the sensor data.

Also, the sensor data pre-processing unit 502 may determine whether it is suitable to extract the state data from the sensor data. When the user has not been photographed in image data of the sensor data, it may be hard to obtain the state data of the user from the image data. Therefore, the sensor data pre-processing unit 502 may generate information indicating whether state data of a lower layer has a valid value, which may be directly obtained from the sensor data, or a degree of inclusion of a noise in the state data of the lower layer.

The state recognition engine selection unit 503 may select an estimation model to be used to obtain the state data, based on the degree of inclusion of the noise in the sensor data or the state data of the lower layer. The device for generating the estimation model may generate a plurality of estimation models for the user by learning information collected with respect to the user. The estimation models may be generated in various forms depending on the state of the user or the surrounding environment. At least one state recognition engine may obtain the state data of the user, based on the estimation model corresponding to the state recognition engine.

The state data obtained from the sensor data including the noise or the state data of the lower layer including the noise may not include appropriate data due to the noise. Therefore, the state recognition engine selection unit 503 may select an estimation model in which the sensor data including the noise or the state data of the lower layer including the noise is not included. When the estimation model is selected by the state recognition engine selection unit 503, the state data of the user may be obtained by a state recognition engine corresponding to the selected estimation model.

The state data acquirement unit 504 may include at least one state recognition engine capable of obtaining the state data of the user. The state data of the user may be obtained by the state recognition engine corresponding to the estimation model selected by the state recognition engine selection unit 503.

The content reception unit 505 may receive content from the outside, or load content stored in a memory of the device 500.

The content display unit 506 may display the content received by the content reception unit 505 through a display. When the content includes an audio signal, the content display unit 506 may output the content through a speaker. Also, the content display unit 506 may display the information about a service to be provided to the user through the display, or output the information about the service to be provided to the user as vibration or sound through a vibrator or a speaker, based on state data of each layer.

The content preference determination unit 507 may calculate content preference of the user by using the state data obtained by the state data acquirement unit 504.

The content recommendation result generation unit 509 may generate information about content to be recommended to the user, based on information about the content preference of the user.

The content recommendation result display unit 510 may display the information about the content to be recommended to the user, which is generated by the content recommendation result generation unit 509, through the display.

Figure 15:
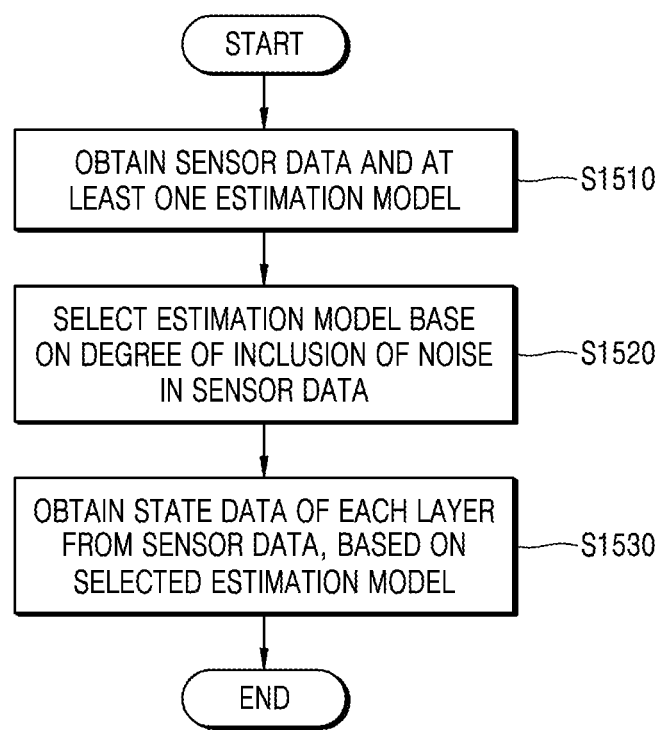
FIG. 15 is a flowchart of a method of obtaining state data by using an estimation model selected based on a degree of inclusion of a noise in sensor data, according to an embodiment.

FIG. 15 is a flowchart of a method of obtaining state data by using an estimation model selected based on a degree of inclusion of a noise in sensor data, according to an embodiment.

Referring to FIG. 15, in operation S1510, the device 500 may obtain sensor data and at least one estimation model including information for obtaining state data. The estimation model may include information about which data is based to obtain each state data. At least one estimation model may include different pieces of information according to the state of the user or the surrounding environment when the estimation model is generated.

In operation S1520, the device 500 may select an estimation model for obtaining state data, based on whether the sensor data includes a noise. In the device 500, different weight values may be applied to the state data obtained by the estimation model using the sensor data, which is determined as including the noise, according to a degree of inclusion of a noise in the sensor data.

In operation S1530, the device 500 may obtain state data of each layer from the sensor data based on the estimation model selected in operation S1520. State recognition engines respectively corresponding to the selected estimation models may obtain state data from the sensor data, based on the estimation models corresponding to the state recognition engines.

Also, the device 500 may display information about a service to be provided to the user through the display, or output the information about the service to be provided to the user as vibration or sound through a vibrator or a speaker, based on state data of each layer.

Figure 16:
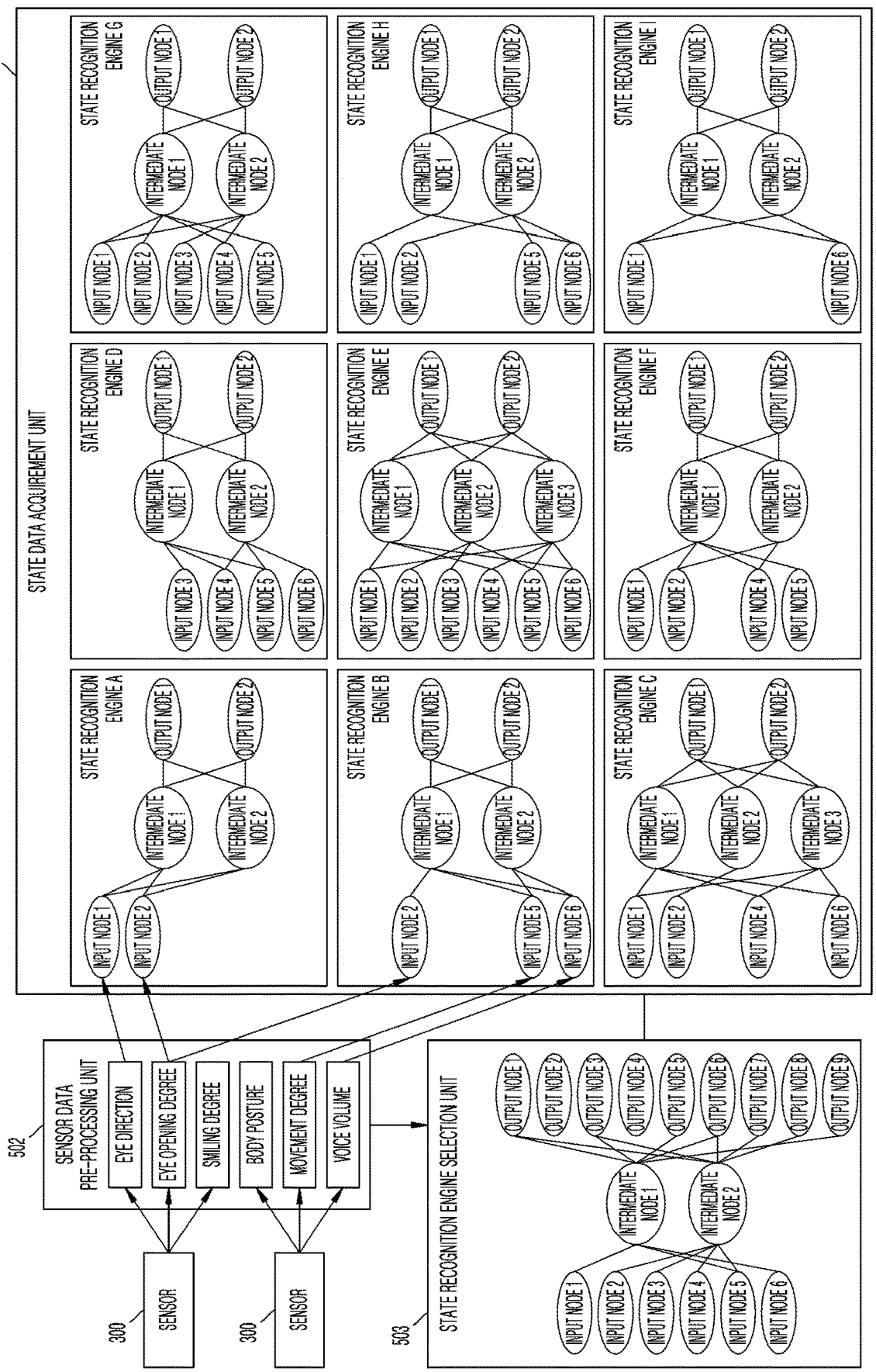
FIG. 16 is a diagram illustrating an example of obtaining state data based on an estimation model selected depending on a degree of inclusion of a noise in sensor data, according to an embodiment.

FIG. 16 is a diagram illustrating an example of obtaining state data based on an estimation model selected according to a degree of inclusion of a noise in sensor data, according to an embodiment.

Referring to FIG. 16, sensor data from a plurality of sensors 300 may be transferred to a sensor data pre-processing unit 502. The sensor data pre-processing unit 502 may extract, from the sensor data, state data of a lower layer, such as an eye direction, an eye opening degree, a smiling degree, a body posture, a movement degree, or a voice volume. When a noise is included in the sensor data, it may be determined that the state data of the lower layer, which is obtained from the sensor data, also includes a noise. The following description in connection with FIG. 16 is given under the assumption that state data is obtained based on a degree of inclusion of a noise in the state data of the lower layer as illustrated.

The sensor data pre-processing unit 502 may determine a degree of inclusion of a noise in the state data of each lower layer. Information about the degree of inclusion of the noise in the state data of the lower layer may be determined according to information about an operation state of a sensor or surrounding environment of the sensor, which is included in the sensor data. For example, the sensor data pre-processing unit 502 may generate information indicating the degree of inclusion of the noise in the state data of the lower layer.

Referring to FIG. 16, state data for the smiling degree and the body posture may not have a valid value. Therefore, information about state data for the eye direction, the eye opening degree, the movement degree, or the voice volume may include information indicating that the state data does not include the noise or that the state data includes the noise which is small enough to determine that a value of the state data is valid. Also, the information about the state data for the smiling degree and the body posture may include information indicating that the state data is invalid because the state data includes the noise.

The state recognition engine selection unit 503 may select a state recognition engine by selecting an estimation model, based on the information about the degree of inclusion of the noise in the state data of the lower layer, which is generated by the sensor data pre-processing unit 502. Selection of the state recognition engine may be performed in such a way that a weight value for each state recognition engine is determined as a value between 0 and 1. The state recognition engine selection unit 503 may determine a weight value for the selected state recognition engine as a value greater than 0 and to equal to or less than 1, and determine a weight value for a non-selected state recognition engine as 0.

Each state recognition engine may output state data of a higher layer from the state data of the lower layer by using an estimation model corresponding thereto. In FIG. 16, the state data of the lower layer may be input to the state recognition engine through input nodes 1 to 6. Also, the state data of the higher layer may be output from the state recognition engine through output nodes 1 to 9. An intermediate node of the state recognition engine may correspond to state data of the above-described intermediate layer. The intermediate node may not be included in the state recognition engine depending on estimation models. The state recognition engine illustrated in FIG. 16 is only an example, and each state recognition engine may obtain state data by using various types of estimation models.

The state data of the higher layer which may be output through the output nodes 1 to 9 may be finally determined according to the weight value for the state recognition engine as expressed in Equation 19 below.

$$R = \sum_{i=1}^{n} w_i r_i, \sum_{i=1}^{n} w_i = 1 \qquad \text{[Equation 19]}$$

R is state data of a high layer which may be finally output from the state data acquirement unit 504, and n is the total number of state recognition engines. $w_i$ is a weight value to be applied to the state recognition engine i, and $r_i$ denotes state data output from the state recognition engine i.

The state recognition engine selection unit 503 may determine weight values for state recognition engines C, D, E, F, and G including the input nodes 3 and 4 respectively corresponding to state data for the smiling degree and the body posture, as 0. In addition, the state recognition engine selection unit 503 may determine weight values for state recognition engines A, B, H, and I including the remaining input nodes 1, 2, 5, and 6, as a non-zero value. The state recognition engine selection unit 503 is not limited to the above-described example, and may determine a weight value differently depending on the degree of inclusion of the noise in the state data.

Also, the state recognition engine selection unit 503 may determine weight values of some state recognition engines as 0, regardless of a degree of inclusion of a noise in the state data, so as to exclude a state recognition engine including an estimation model unsuitable to obtain state data according to a state of the user.

The state data acquirement unit 504 may output the state data of the higher layer output from each state recognition engine, based on the weight value determined by the state recognition engine selection unit 503.

The device 100 may display the information about a service to be provided to the user through the display, or output the information about the service to be provided to the user as vibration or sound through a vibrator or a speaker, based on the state data of the higher layer obtained by the state data acquirement unit 504.

Figure 17:
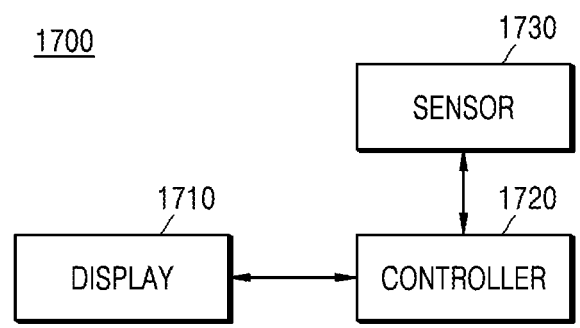
FIG. 17 is a block diagram of an internal structure of a device for obtaining state data, according to an embodiment.

FIG. 17 is a block diagram of an internal structure of a device for obtaining state data, according to an embodiment.

Referring to FIG. 1, the device 1700 may include a display 1710, a controller 1720, and a sensor 1730.

The display 1710 may display information about a service to be provided to a user, based on state data obtained by the device 1700. Also, the display 1710 may display a variety of content according to a user demand.

Also, the device 1700 is not limited to the above-described example, and the device 1700 may display information about a service to be provided to the user through a display, or output the information about the service to be provided to the user as vibration or sound through a vibrator or a speaker, based on state data of each layer.

The controller 1720 may obtain the state data belonging to a plurality of layers from the sensor data by using an estimation model. The state data of a lower layer may be obtained from the sensor data and the state data of a higher layer may be obtained from the state data of the lower layer.

The controller 1720 may provide a service to the user, based on the state data of the higher layer.

Also, the controller 1720 may obtain state data at a certain time point from state data at a previous time point by using a prediction model. The controller 1720 may correct a state value of the state data obtained using the estimation model, by using the state data obtained using the prediction model.

Also, the controller 1720 may select an estimation model based on a degree of inclusion of a noise in the sensor data and obtain state data based on the selected estimation model. The controller 1720 may determine a weight value to be applied to the state data obtained from each estimation model based on a degree of inclusion of a noise in the sensor data.

The sensor 1730 may obtain the sensor data including information about a user or surrounding environment of the user. The sensor 1730 may include various types of sensors, such as a camera, a microphone, a position detection sensor, and an acceleration sensor. The controller 1720 may obtain the state data of the user based on the sensor data obtained by the sensor 1730.

According to an embodiment, it is possible to efficiently obtain state data indicating a state of the user even when the sensor data includes a noise or the sensor data is not acquired.

The methods according to the embodiments may be embodied as program instructions that can be executed by various computing units and recorded on a computer-readable recording medium. Examples of the computer-readable recording medium may include program instructions, data files, and data structures solely or in combination. The program instructions recorded on the computer-readable recording medium may be specifically designed and configured for the present invention, or may be well known to and usable by those of ordinary skill in the field of computer software. Examples of the computer-readable recording medium may include magnetic media (e.g., a hard disk, a floppy disk, a magnetic tape, etc.), optical media (e.g., CD-ROM, DVD, etc.), magneto-optical media (e.g., a floptical disk, etc.), and a hardware device specially configured to store and execute program instructions (e.g., ROM, RAM, a flash memory, etc.). Examples of the program instructions may include not only machine language codes prepared by a compiler but also high-level codes executable by a computer by using an interpreter.

While the descriptions have focused on novel features of the present invention that are applied to various embodiments, it will be understood by those skilled in the art that various deletions, substitutions, and modifications can be made to the apparatuses and the methods described above, without departing from the scope of the present invention. Therefore, the scope of the present invention is defined by the appended claims. All modifications within the equivalents of the claims fall within the scope of the present invention.

The invention claimed is:

1. A method comprising:
obtaining estimation models for obtaining pieces of state data existing in a plurality of layers from sensor data obtained by a plurality of different sensors, the estimation models including information about how different sensor data from the different sensors are each respectively weighted for estimating a piece of state data in a layer of the estimation models;
obtaining at least one piece of sensor data from each of the plurality of different sensors;
identifying whether at least one of the pieces of sensor data has noise; and
based on identifying that at least one of the pieces of sensor data has noise:
  selecting an estimation model that does not include a sensor that detected the at least one of the pieces of sensor data that has noise; and
  obtaining state data of the layer of the estimation model based on the selected estimation model using the pieces of sensor data that do not include the noise;
identifying content corresponding to the obtained state data; and
outputting, via a speaker or a display, the content, wherein the state data of the estimation models includes one or more of: eye opening information, front view degree of face information, front view degree of body posture, movement information, smiling degree information or voice volume information.

2. The method of claim 1, further comprising:
calculating a preference of a user for the content, based on the obtained state data of the layer of the estimation model; and
selecting at least one content to be output, as a recommendation, to the user, based on the preference of the user for the content.

3. The method of claim 1, wherein
the obtaining of the state data of the layer comprises determining at least one of a reliability value or a state value for the state data of the layer, based on a degree of inclusion of the noise in the sensor data.

4. The method of claim 1, further comprising:
determining a state value of state data of another layer of the estimation model, based on a reliability value of the state data of the layer of the estimation model.

5. The method of claim 1, wherein
the state data of the layer is obtained at a first time point,
state data of another layer is obtained at a second time point, which is after the first time point; and
the method further comprises correcting the state data of the other layer by using the obtained state data of the layer.

6. The method of claim 1, wherein
the sensor data comprises information about a degree of inclusion of noise, and
the selecting of the estimation model includes: selecting, as the estimation model, at least one estimation model from the obtained estimation models, based on the information about the degree of inclusion of the noise in the sensor data.

7. An apparatus comprising:
a sensor; and
a processor configured to:
  obtain estimation models for obtaining pieces of state data existing in a plurality of layers from sensor data obtained by a plurality of different sensors, the estimation models including information about how different sensor data from the different sensors are each respectively weighted for estimating a piece of state data in a layer of the estimation models;
  obtain at least one piece of sensor data from each of the plurality of different sensors;
  identify whether at least one of the pieces of sensor data has noise; and
  based on identify that at least one of the pieces of sensor data has noise:

select an estimation model that does not include a sensor that detected the at least one of the pieces of sensor data that has noise; and obtain state data of the layer of the estimation model based on the selected estimation model;

identify content corresponding to the obtained state data; and output, via a speaker or a display, the content, wherein the state data of the estimation models includes one or more of: eye opening information, front view degree of face information, front view degree of body posture, movement information, smiling degree information or voice volume information.

8. The apparatus of claim 7, wherein the processor is further configured to:

calculate a preference of a user for the content, based on the obtained state data of the layer of the estimation model; and select at least one content to be output, as a recommendation, to the user, based on the preference of the user for the content.

9. The apparatus of claim 7, wherein the processor is further configured to determine at least one of a reliability value or a state value for the state data of the layer, based on a degree of inclusion of noise in the sensor data.

10. The apparatus of claim 7, wherein the processor is further configured to determine a state value of state data of another layer of the estimation model, based on a reliability value of the state data of the layer.

11. The apparatus of claim 7, wherein the state data of the layer is obtained at a first time point, state data of another layer is obtained at a second time point, which is after the first time point; and the processor is further configured to correct the state data of the other layer by using the obtained state data of the layer.

12. The apparatus of claim 7, wherein the sensor data comprises information about a degree of inclusion of noise, and the processor is further configured to:

select, as the estimation model, at least one estimation model from the obtained estimation models, based on the information about the degree of inclusion of the noise in the sensor data.

13. The apparatus of claim 7, further comprising the speaker or the display.

14. A non-transitory computer-readable recording medium having recorded thereon a program for performing the method of claim 1.

* * * * *